United States Patent
Raschbacher et al.

(10) Patent No.: US 12,461,622 B2
(45) Date of Patent: Nov. 4, 2025

(54) TEST METHODS FOR CAPACITIVE TOUCH SCREENS, AND CAPACITIVE TOUCH SCREEN ASSEMBLIES

(71) Applicant: NXP B.V., Eindhoven (NL)

(72) Inventors: Sebastian Raschbacher, Meinheim (DE); Hubert Martin Bode, Haar (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/675,524

(22) Filed: May 28, 2024

(65) Prior Publication Data

US 2024/0402845 A1    Dec. 5, 2024

(30) Foreign Application Priority Data

Jun. 1, 2023   (EP) .................................... 23176843

(51) Int. Cl.
*G06F 3/041* (2006.01)
*G06F 3/044* (2006.01)

(52) U.S. Cl.
CPC .......... *G06F 3/0416* (2013.01); *G06F 3/0446* (2019.05)

(58) Field of Classification Search
None
See application file for complete search history.

(56) References Cited

U.S. PATENT DOCUMENTS

| | | | | |
|---|---|---|---|---|
| 10,528,189 B2 * | 1/2020 | Andrle | ................ | G06F 3/0418 |
| 2012/0187954 A1 * | 7/2012 | Hsu | ................ | G09G 3/006 |
| | | | | 324/537 |
| 2020/0064154 A1 | 2/2020 | Gray et al. | | |
| 2022/0011362 A1 * | 1/2022 | Zhang | ................ | G01R 31/2829 |
| 2022/0018894 A1 | 1/2022 | Bai et al. | | |

FOREIGN PATENT DOCUMENTS

CN     102981686 B     3/2013

OTHER PUBLICATIONS

U.S. Appl. No. 18/587,195, Goussin et al., "Touch Panel Location Detection With Different Frequency-Phase Offset Combinations of Electrode Signals," filed Feb. 26, 2024.
U.S. Appl. No. 18/664,150, Darthenay et al., "Capacitive Touch Screens," filed May 14, 2024.
U.S. Appl. No. 18/595,499, Darthenay et al., "Touch Panel System Using Modulated Signals as Drive Signals," Mar. 5, 2024.

* cited by examiner

*Primary Examiner* — Stephen T. Reed (57) ABSTRACT

A touch screen assembly and method of testing a capacitive touch screen are disclosed, during operation thereof in which a respectively unique drive signal is applied to each of a first plurality of lines, and each of a second plurality of lines is responsive thereto, wherein a change in a response on a one of the second plurality of lines to a one of the unique drives signals is indicative of a touch event at a cross-point of the respective ones, the method comprising: modifying an amplitude of the respective unique drive signal applied to each of the first plurality of lines; and in the event of identifying a response to each modified amplitude, on each of the second plurality of read lines, determining that the touch screen does not have a fault, and otherwise determining that the touch screen has a fault.

20 Claims, 7 Drawing Sheets

TEST METHODS FOR CAPACITIVE TOUCH SCREENS, AND CAPACITIVE TOUCH SCREEN ASSEMBLIES

CROSS-REFERENCE TO RELATED APPLICATIONS

This application claims the priority under 35 U.S.C. § 119 of European Patent application no. 23176843.3, filed on 1 Jun. 2023, the contents of which are incorporated by reference herein.

FIELD

The present disclosure relates to touch screens, which may also be referred to as touch panels or touch sensors, and in particular to touch screens or touch panels which use capacitive coupling for sensing.

BACKGROUND

One method of sensing touch on a panel or touch is based on capacitive coupling between two galvanically isolated electrodes. The capacitance between two electrodes is affected by the nature of the dielectric material between them. If the dielectric is modified, for instance by introducing a finger or other object touching the panel, the capacitance between the electrodes is changed, and this change in capacitance can be detected. In order to locate the position of the touch, a matrix of capacitors may be constructed by providing a first set of electrodes as a series of, generally parallel, lines across the screen, and a second set of electrodes as a further series of, generally parallel, lines down the screen. Each combination of a first electrode with a second electrode forms a capacitor, the mutual capacitance of which is modified by touch event at or close to the intersection between that first electrode and that second electrode.

In typical operation, all of the first electrodes, which may also be referred to as drive lines, are driven at the same time by respective drivers, by signals which are distinguishable. Each signal is coupled to each of the second electrodes, which may also be referred to as read lines, at the intersection of that signal's drive line with that second electrode. By analysing the signals received on each of the read lines by means of the mutual couplings at intersections, changes in any one of those mutual couplings can be identified, and the touch event localised.

A fault, or break, in any of the drive electronics, drive lines, read lines, or receivers, may impact the correct operation of the touch screen. In particular, a fault may result in a touch or touch event not being properly detected by the screen. Particularly, but not exclusively, for safety critical applications, it would be useful to have a reliable means of testing for correction operation of the touch screen during the screen's lifetime. It is possible to electrically characterise the screen during a final assembly and test process, and store the characterisation for later comparison with a characterisation of the screen. However, this may involve complex re-characterisation. Other methods of self-testing the screen may be desirable.

SUMMARY

According to a first aspect of the present disclosure, there is provided a method of testing a capacitive touch screen, during the operation of which a respectively unique drive signal is applied to each of a first plurality of lines, and each of a second plurality of lines is responsive to each of the respectively unique signals, wherein a change in a response on a one of the second plurality of lines to a one of the unique drives signals is indicative of a touch event at a cross-point of the respective one of the first plurality of lines with the respective one of the second plurality of lines, the method comprising: modifying an amplitude of the respective unique drive signal applied to each of the first plurality of lines; and in the event of identifying a response to each modified amplitude, on each of the second plurality of read lines, determining that the touch screen does not have a fault, and otherwise determining that the touch screen has a fault. The first plurality of lines may be a plurality of drive lines, and the second plurality lines may be plurality of read lines.

In one or more embodiments, the method further comprises, in the event of: identifying, for a unique drive signal applied to a one of the first plurality of lines, a response to the modified amplitude on a subset of the second plurality of lines, the subset consisting of less than the second plurality; and identifying a response to each of a remainder of the modified amplitudes, on each of the second plurality of read lines; determining that the touch screen has a fault on the respective one of the first plurality of lines.

In one or more embodiments, the method further comprises, in the event of: identifying, for a subset of the unique drive signals applied to respective ones of the first plurality of lines, a response to the modified amplitude on each of the second plurality of lines except a one of the second plurality of lines; determining that the touch screen has a fault on the one of the second plurality of lines.

In one or more embodiments, the method further comprises, in the event of: identifying, for each of the unique drive signals applied to respective ones of the first plurality of lines, a response to the modified amplitude on each of the second plurality of lines except a one of the second plurality of lines; determining that the touch screen has a fault on a receive circuit of the one of the second plurality of lines.

In one or more embodiments, the method further comprises, in the event of: identifying, for each of the unique drive signals applied to respective ones of the first plurality of lines except a one of the unique drive signals, a response to the modified amplitude on each of the second plurality of lines; determining that the touch screen has a fault on a drive circuit for providing the one of the unique drive signals.

In one or more embodiments, modifying an amplitude of the drive signal comprises reducing the amplitude of the drive signal. Thus the modification may be a single change, and the signal remained static thereafter for the duration of that part of the test.

In one or more other embodiments, modifying an amplitude of the drive signal comprises toggling the amplitude of the drive signal between a low value and a high value. In one or more such embodiments, modifying an amplitude of the drive signal comprises toggling the amplitude of the drive signal between a first value and zero. Modifying the signal by means of a modulation such as toggling between on or off or a high and low value may be less prone to interference than a simple reduction in the amplitude. Conversely, additional processing power may be required at the receiver.

In one or more embodiments, the method further comprises, after determining a response to the modified drive signal, on each of the second plurality of read lines: identifying a change in response on a one of the read lines to a one of the unique drive signals, and determining a touch event at a cross-point of the drive line having the unique drive signal with the one of the read lines. In such embodiments, a touch event may comprise a physical contact between a user and the touch screen.

In one or more embodiments, the method further comprises, in event of identifying no response to the modified drive signal, on each of the second plurality of read lines, determining that the touch screen has a drive circuit fault, wherein the drive circuit comprises the respective drive line and a driver connected to that drive line.

In one or more embodiments, the first plurality of drive lines and the second plurality of read lines are arranged in a matrix. Images configuration may be convenient for localising a touch event.

In one or more embodiments, a respective cross-point between a drive line and a read line comprises a region of the touch screen in which the drive line and the read line are capacitively coupled. In such embodiments, direct physical contact may not be required with the panel and positioning a finger or other field-disturbing objects close to the intersection may be sufficient to trigger a touch event In one or more embodiments, the unique drive signals are orthogonal frequency signals. Use of orthogonal signals may be convenient in order to uniquely determine localisation of a touch event.

A method according to any preceding claim, further comprising injecting a unique test signal on a one of the second plurality of lines, and in response to an event of identifying a response to the test signal, on each of the first plurality of read lines, determining that the touch screen does not have a fault.

According to a second aspect of the present disclosure, there is provided a capacitive touch screen assembly, comprising: a first plurality of lines, each having a driver therefor; a second plurality of lines each having a receiver therefor; a respective cross-point between each of the first plurality of lines; and a controller; wherein the drivers are each configured to apply a respectively unique drive signal to the respective line of the first plurality; wherein a change in a response at a one of the receivers to a one of the unique drives signals is indicative of a touch event at a corresponding cross-point;
wherein the controller is configured to: control the drivers to modify an amplitude of the respective unique drive signal applied to each of the first plurality of lines; and in the event of identifying a response to each modified amplitude, on each of the second plurality of lines, determine that the touch screen does not have a fault, and otherwise determine that the touch screen has a fault. The controller may be integral with a touch screen itself or may be a separate part of the assembly.

According to one or more embodiments, the controller is further configured to, in the event of: identifying, for a unique drive signal applied to a one of the first plurality of lines, a response to the modified amplitude on a subset of the second plurality of lines, the subset consisting of less than the second plurality; and identifying a response to each of a remainder of the modified amplitudes, on each of the second plurality of lines; determine that the touch screen has a fault on the respective one of the first plurality of lines.

According to one or more embodiments, the controller is further configured to, in the event of: identifying, for a subset of the unique drive signals applied to respective ones of the first plurality of lines, a response to the modified amplitude on each of the second plurality of lines except a one of the second plurality of lines; determine that the touch screen has a fault on the one of the second plurality of lines.

According to one or more embodiments, the controller is further configured to, in the event of: identifying, for each of the unique drive signals applied to respective ones of the first plurality of lines, a response to the modified amplitude on each of the second plurality of lines except a one of the second plurality of lines; determine that the touch screen has a fault on a receive circuit of the one of the second plurality of lines.

According to one or more embodiments, the controller is further configured to, in the event of: identifying, for each of the unique drive signals applied to respective ones of the first plurality of lines except a one of the unique drive signals, a response to the modified amplitude on each of the second plurality of lines, determine that the touch screen has a fault on a drive circuit for providing the one of the unique drive signals.

According to one or more embodiments, the controller is configured to control the drivers to modify an amplitude of the respective unique drive signal applied to each of the first plurality of lines, by a one of reducing the amplitude of the drive signal, toggling the amplitude of the drive signal between a low value and a high value, and toggling the amplitude of the drive signal between a first value and zero.

According to one or more embodiments, the first plurality of lines and the second plurality of lines are arranged in a matrix of drive and read lines. Furthermore, a respective cross-point between a drive line and a read line may comprise a region of the touch screen in which the drive line and the read line are capacitively coupled.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Figure 1:
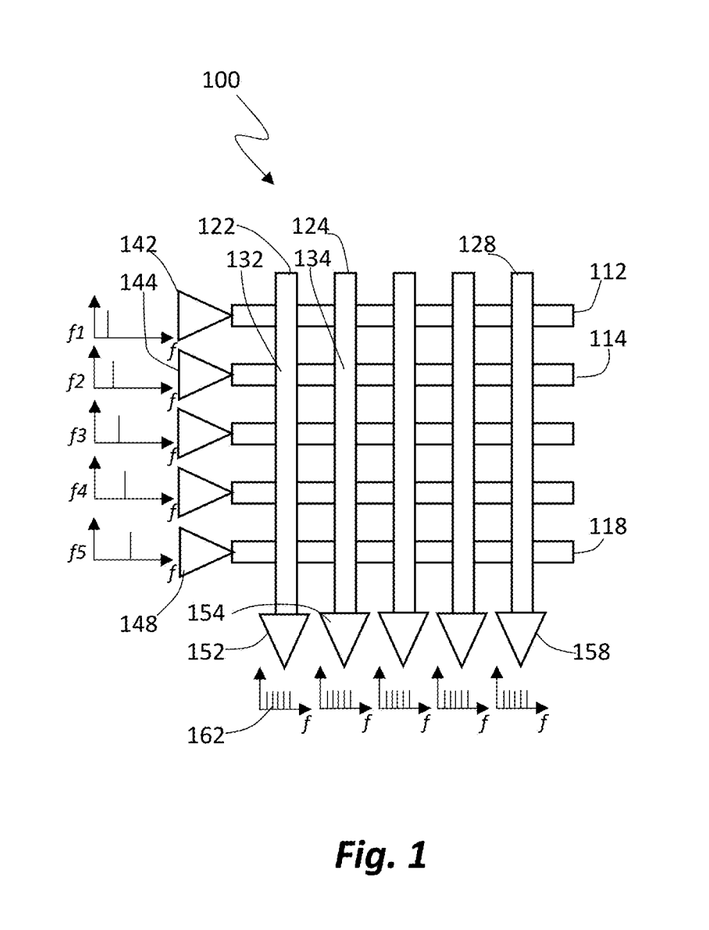
FIG. 1 illustrates, schematically, a multi-electrode matrix of a touch screen.

FIG. 1 illustrates, schematically, a multi-electrode matrix of a touch screen 100. The touch screen is generally rectangular, although it may be square, or be of a different shape, for instance having bevelled corners.

The active area of the screen—that is to say the area which may be sensed—is covered by a two-layer grid of electrodes, or lines. A first layer of electrodes comprises individual lines 112, 114 ... 118 which extend generally along its length. For the sake of definiteness, but without limitation, this first layer of electrodes will also be referred to as "rows" hereinunder. A second layer of electrodes comprises individual lines 122, 124, ... 128 which extend generally along the height. For the sake of definiteness, but without limitation, this second layer of electrodes will also be referred to as "columns" hereinunder. The first layer of electrodes is galvanically isolated from the second layer of electrodes. Each electrode of the first layer of electrodes intersects each electrode of the second layer of electrodes at an intersection or cross-point, such as those shown at 132 and 134.

For each row of the first layer of electrodes, there is a driver 142, 144 ... 148. The drivers are typically unique or dedicated to a single row, although in other embodiments, the drivers may drive more than one row, for instance by time-interleaving, or with sufficient spatial separation to enable disambiguation. For each column of the second layer of electrodes, there is a unique receiver 152, 154 ... 158. In a typical operation, each driver is driven with a unique frequency fk, such as frequencies f1, f2 ... f5 as shown. The signal is conveniently, but need not be limited to, a sinewave which may also be referred to as a "tone", since this enables easily mapping of the frequency content of the signal to the row number, and avoids coupling with other tones. The relationship between the frequency is given by fk+1=fk+frate, where frate is a spacing (in frequency space) between tones and may be linked to a sensing refresh rate of the panel. In other words, the frequencies map on an Frate grid. With each Rowk having a unique frequency fk (which may also sometimes referred to as a mutual frequency), the consequence is the total occupied spectrum is a function of the number of rows nr, i.e. fnr=f1+nr*frate, where nr is the number of rows.

All the drivers and receivers are typically working continuously and at the same time. As a consequence and because of the mutual coupling at each cross-point, each receiver at the end of a respective column sees the frequency content of all the drivers, as illustrated in FIG. 1 schematically at sketch 162. In particular, receiver 152 sees a series of tones, have frequencies of f1, f2, ... fn. Similarly, receiver 154 sees the same series of tones, have frequencies of f1, f2, ... fn. To aid understanding, the tones are each shown as having the same amplitude, although that is a simplification, since factors such as the path length and the frequency of the tone will affect the amplitude of each received tone.

Figure 2:
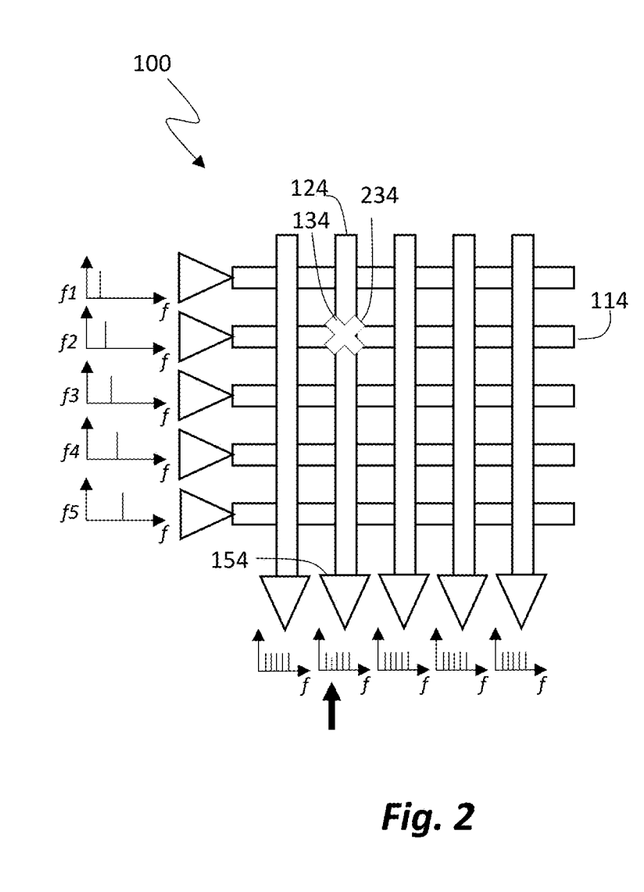
FIG. 2 shows the touch panel 100 of FIG. 1 in the event of a touch or a touch event.

FIG. 2 shows the touch panel 100 of FIG. 1 in the event of a touch or a touch event. In the example shown, the touch event 234 occurs proximate to the cross-point 134. As a result, the local mutual capacitances between the affected row (in this case, row 114) and the affected column (in this case column 124) is changed; it can be demonstrated that the mutual capacitance becomes smaller. The coupling of the touched row (114 in the case illustrated) to the touched column (124 in the case illustrated) at the cross-point loosens or reduces, and the signal content sensed by the receiver 154 at the column's end will be less for the frequency corresponding to the touched row. In the example illustrated, where there is a touch on row 114 which is transmitting a signal frequency f2, and column 124 which is connected to receiver 154, that receiver will see a smaller signal at f2.

This sensing technique requires that for each receiver (hence, each column), a frequency content analysis is performed, to discriminate the change due to the touch. The skilled person will appreciate that other discrimination techniques exist, other than the frequency discrimination shown in the example above. For example, orthogonal modulation, such as OFDM, of phase, frequency or amplitude may enable the same discrimination.

It would be useful to be able to test for correct operation of the touch panel during normal operation.

Figure 3A:
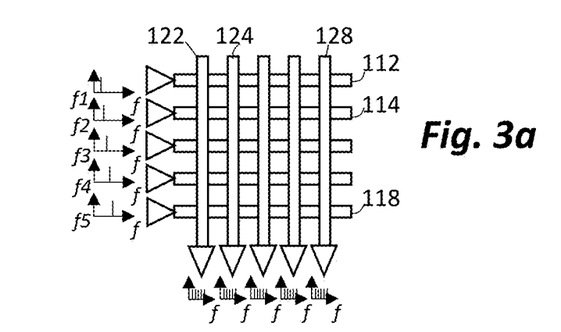
FIG. 3a, FIG. 3b and FIG. 3c illustrate a method according to one aspect of the present disclosure, under conditions in which no fault conditions are detected.
Figure 3B:
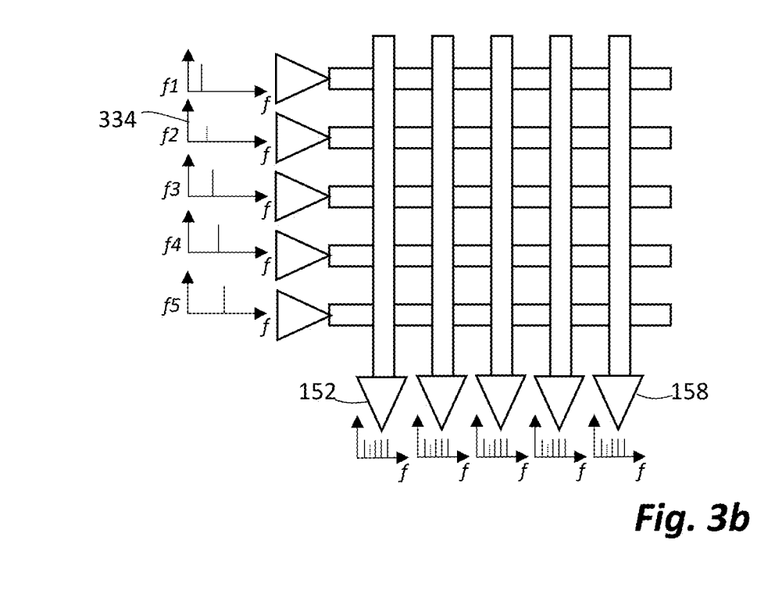
Figure 3C:
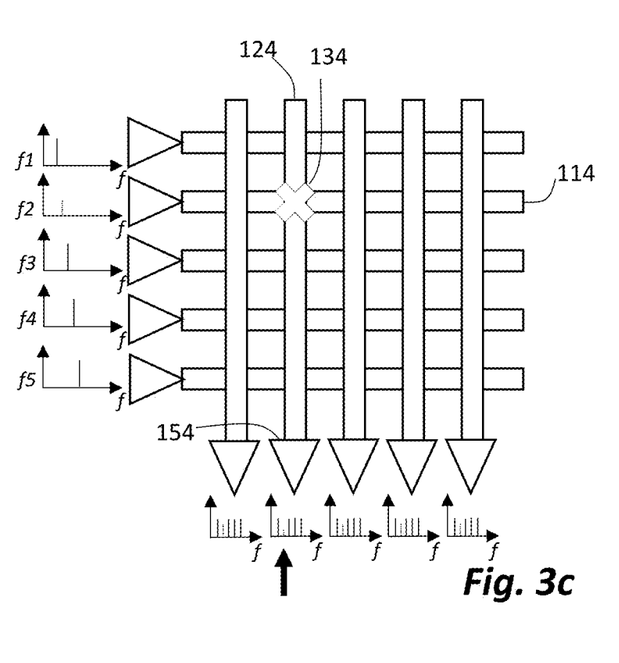

FIG. 3a, FIG. 3b and FIG. 3c illustrate a method according to one aspect of the present disclosure, under conditions in which no fault conditions are detected. As shown in FIG. 3a, a respectively unique drive signal is applied to each of a first plurality of drive lines. The drive lines are shown as rows 112, 114 ... 118. Each of a second plurality of read lines is responsive to each of the respectively unique signals. The read lines are shown as columns 122 124 ... 128.

As shown in FIG. 3b, the unique drive signal applied to a one of the drive lines is modified, in this case, by reducing its amplitude, as can be seen from sketch 334 in which the transmitted tone f2 is smaller than the tones transmitted by the other drivers. In the no-fault situation, as shown at FIG. 3b, the signal received at each of the receivers reflects the reduction in the transmitted tone f2, as can be seen in the example shown wherein each of the receivers 152, 154 ... 158 shows a reduction in amplitude of the received signal at frequency f2 component of the composite received signal. Since a response to the modified amplitude is identified on each of the receivers, that is to say on each of the second plurality of read lines, it may be determined that the touch screen does not have a fault.

The self-test illustrated by FIG. 3a and FIG. 3b may be undertaken even during operation of the touch screen. This is illustrated by FIG. 3c in which, whilst the modification is made to a drive signal, a touch event occurs at an intersection or cross-point which is coupled to a receiver by the drive line transmitting that drive signal. In particular, FIG. 3c illustrates the example of a touch event at intersection 134 between row 114 and column 124, whilst the tone f2 on that drive line is being modified as part of the self-test. Whereas all of the receivers receive a modified amplitude to the tone f2 as part of their composite received signal, the receiver 154 at the end of column 124 identifies a further modification arising from the touch event—that is to say in this case a further reduction in the amplitude of the received signal at tone f2. The control electronics is able to identify this further modification, and thus correctly identify the touch event.

FIG. 3a, FIG. 3b and FIG. 3c illustrates operation of the self-test method for a fault-free touch screen in which a touch events occurs during and after the commencement of the self-test on the affected drive line. The self-test method may also operate correctly in the event that the touch event commences prior to the commencement of the self-test on the affected drive line. This is illustrated with reference to FIG. 4a, FIG. 4b and FIG. 4c.

Figure 4A:
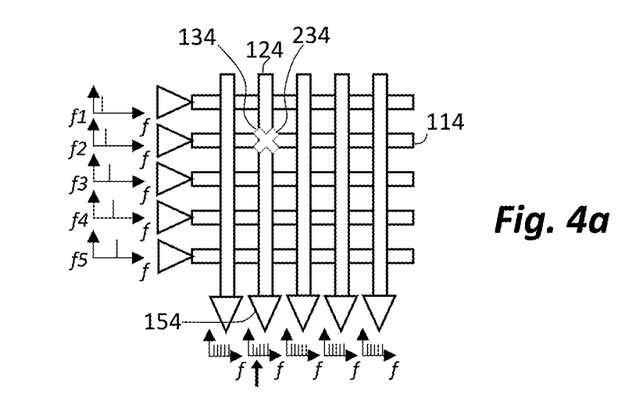
FIG. 4a, FIG. 4b and FIG. 4c illustrate a method according to one aspect of the present disclosure, under fault-free conditions, with a prior-initiated touch.
Figure 4B:
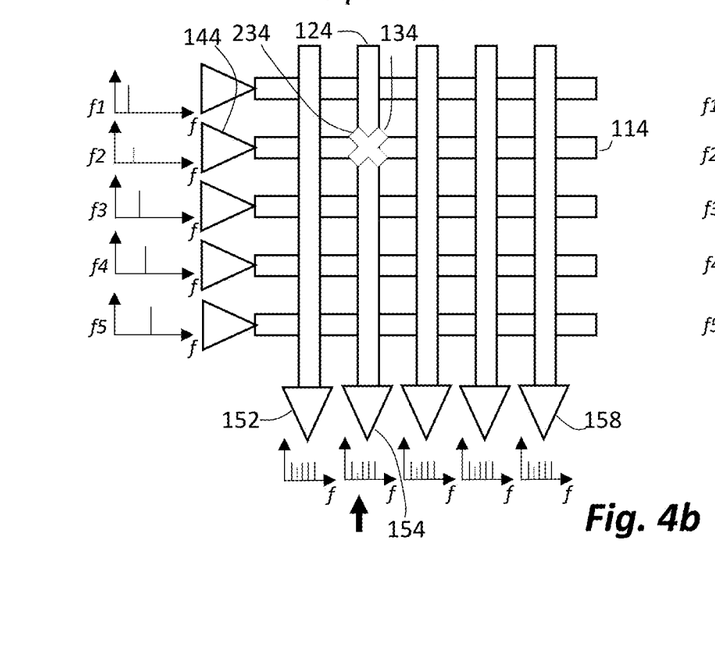
Figure 4C:
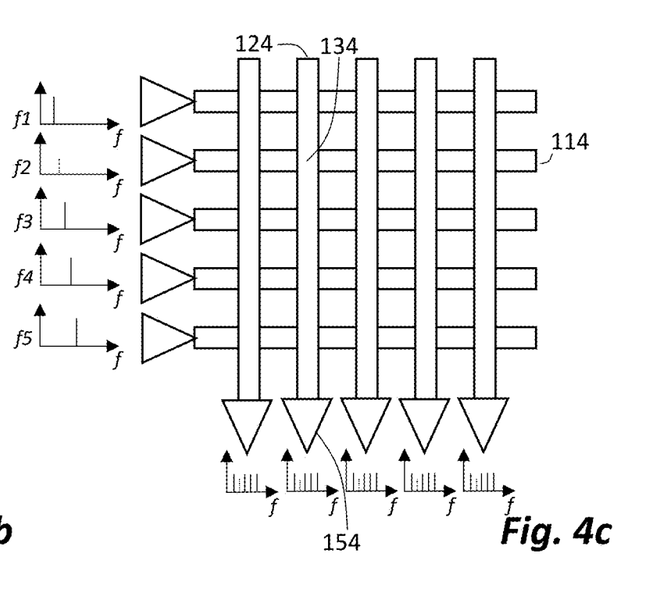

FIG. 4a, FIG. 4b and FIG. 4c illustrate a method according to one aspect of the present disclosure, when no fault condition is detected, and a touch event is initiated prior to the commencement of the self-test on the drive line and is ongoing during at least part of that self-test. As shown in FIG. 4a, similar to touch event illustrated in FIG. 2, the touch event 234 occurs proximate to the cross-point 134, and changes the local mutual capacitances between the affected row (in this case, row 114) and the affected column (in this case column 124); the coupling of the touched row (114 in the case illustrated) to the touched column (124 in the case illustrated) at the cross-point loosens or reduces, and the signal content sensed by the receiver 154 at the column's end will be less for the frequency corresponding to the touched row. In the example illustrated, where there is a touch on row 114 which is transmitting a signal frequency f2, and column 124 which is connected to receiver 154, that receiver will see a smaller signal at f2.

FIG. 4b illustrates the impact of the self-test, whilst the touch event just described is to ongoing. As can be seen, the drive signal at frequency f2 applied by driver 144 is modified, in this case by reducing its amplitude. This reduction in amplitude is detected by the receivers 152, 154 . . . 158, as a reduction in f2-frequency component of the signals received by each of the receivers 152, 154 . . . 158. In the case of receiver 154, that tone is already reduced because of the changing mutual capacitance due to the touch event 234. However, the further modification, which in this case is a further reduction, may generally be detectable by the receiver and is indicative that there is no break fault in the signal path between transmitter 144 and receiver 152. The self-test therefore correctly identifies the fault-free condition.

FIG. 4c illustrates the impact of the ending of the touch event whilst the self-test on the affected drive line is still being implemented. When the touch event ends, the mutual capacitance between drive line 112 and receive line 124 is restored to its default, no touch, value. The f2 frequency component of the signal received by receiver 154 thus increases. However, since the self-test is still in progress, the drive line 144 has a reduced amplitude f2 frequency signal, and this is reflected in the frequency f2 component of the signal received by receiver 154.

Figure 5A:
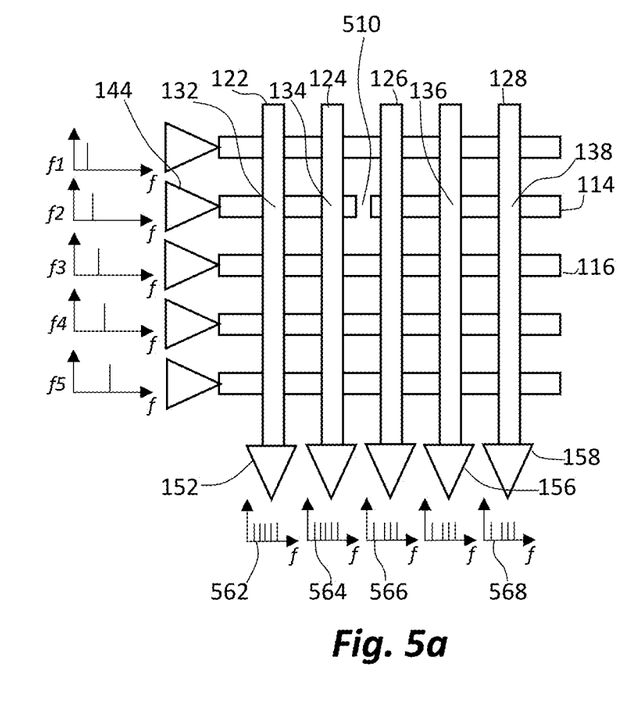
FIG. 5a and FIG. 5b illustrate a method according to one or more embodiments of the present disclosure, testing a touch-screen with a fault.
Figure 5B:
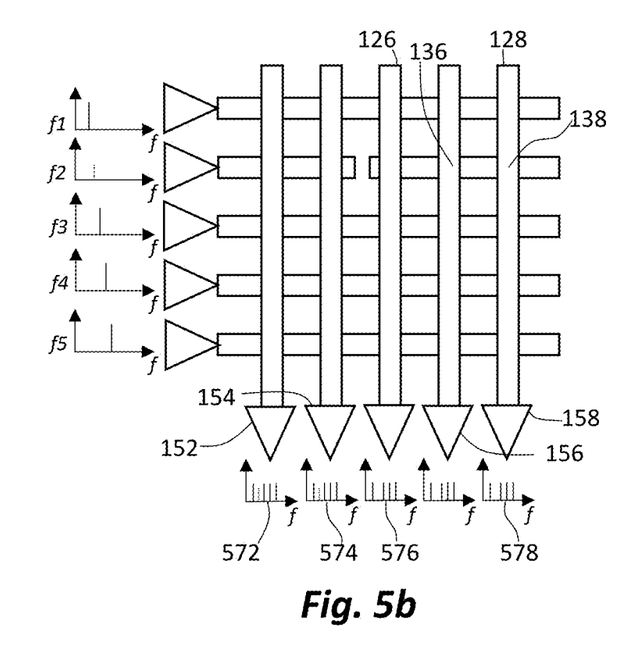

FIG. 5a and FIG. 5b illustrate a method according to one or more embodiments of the present disclosure, under conditions in which a self-test is applied to a touch screen which has a fault therein. In the example illustrated, the fault is a break 510, or open circuit, within one of the drive lines, in this case drive line 114. During normal operation, as shown at FIG. 5a, the tone at frequency f2 provided by driver 144 onto drive line 114 is present at the intersections 132 and 134 with the read lines 122 and 124. However due to the break in the drive line, the tone is not present at the intersections 136, . . . 138 of the drive line 114 with read lines 126 . . . 128. This tone is thus present in the composite signal on read lines 122 and 124, but is absent from the composite signal on read lines 126 . . . 128. In the event of a touch event at proximate to any of the intersections 136 . . . 138, the modification to the mutual coupling induced by the touch event would not be observable on the composite signal is received at receivers 156 . . . 158 since no drive tone is present on the drive and 114 at those intersections. This is shown in the sketches 562, 564, 566 . . . 568, which illustrates the composite signals received by receivers 152, 154, 156 . . . 158 in this instance.

FIG. 5b illustrates the step in the self-test method according to embodiments in which the tone at frequency f2 provided by driver 144 to drive line 114 is modified, in this case by reducing its amplitude. As a result, the receivers 152 and 154 see a reduced amplitude of the frequency f2 component of the composite signal, as illustrated by sketches 572 and 574. However, since there is no signal at frequency f2 at the intersections 136 . . . 138 to be coupled to the received read lines 126 . . . 128, there is no frequency f2 component in the composite signals received by receivers 156 . . . 158, as can be seen by the sketches 576 . . . 578. Comparing the composite signals illustrated in sketches 562, 564 . . . 568 with the corresponding composite signals illustrated in sketches 572, 574 . . . 578, it is apparent that a response to the modified amplitude is identifiable on only a subset of the read lines (in this case 122 and 124). In the event that the modification to the drive signal is detected for each of the remaining other tones f1, f3 . . . f5) on the remaining drive lines 112, 116 . . . 118, it may be concluded that there is a break-fault or open circuit on the drive line 114. By analysis of the subset of receivers for which the modified drive signal is identifiable, the location of the fault on the panel may be identifiable.

Whereas FIG. 5a and FIG. 5b depict a situation in which there is a break on a drive line, methods according to the present disclosure may equally identify a break on a read line. In that case, the composite signal received by the receiver for that read line will be entirely missing one, or more than one, tone even during normal operation. Since modification to the drive lines carrying those tones will have no effect on the received composite signal, that is to say those tones will still be entirely absent from the composite signal, it may be deduced that there is a break on a read line.

Figure 6A:
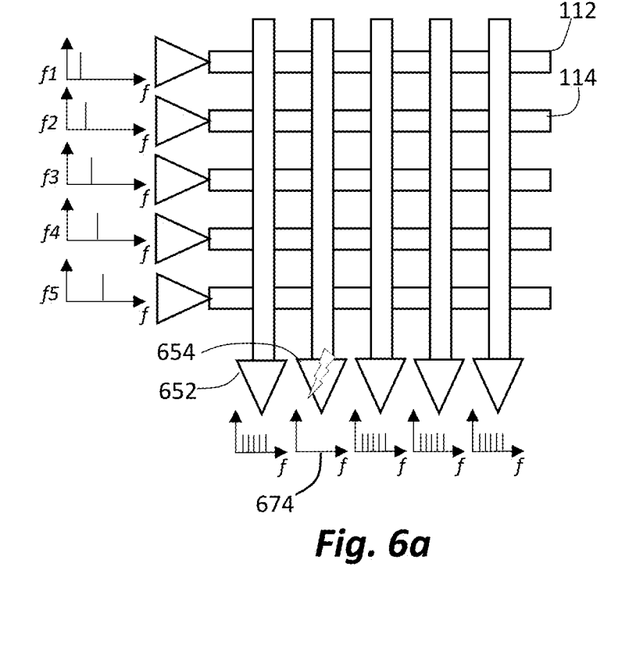
FIG. 6a and FIG. 6b illustrate a method according to one or more embodiments of the present disclosure, testing a touch-screen with another fault.
Figure 6B:
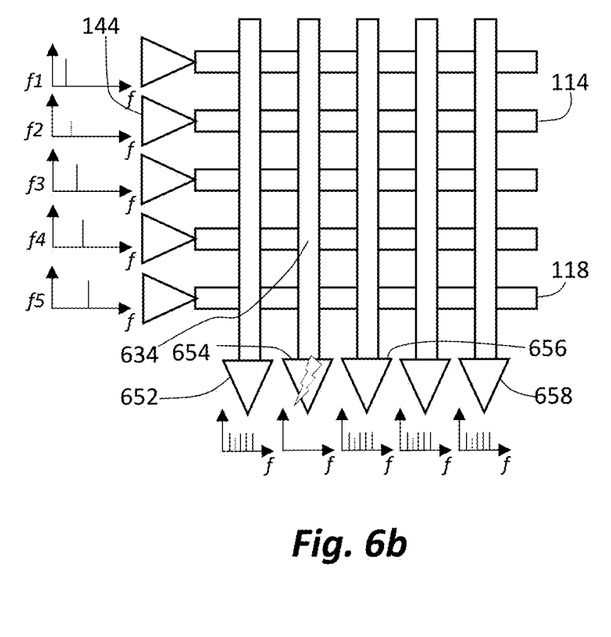

FIG. 6a and FIG. 6b illustrate a method according to one or more embodiments of the present disclosure, in which a self-test is applied to a touch screen which has a fault therein. In this example, the fault is a failure in one of the receivers 652, 654, 656 . . . 658 shown in FIG. 6a, or in the respective receiver circuits associated therewith. As shown, receiver 654 is completely unresponsive, as illustrated by sketch 674, in which the composite signal is completely absent, during normal operation in which the tones with frequency F1, f2 . . . are applied to the drive lines 112, 114 . . . . FIG. 6b shows one step of the self-test method, in particular FIG. 6b shows the step during which the tone having frequency f2 provided by driver 144 to drive line 114 is modified. The composite signals received by each of the receivers 652, 656 . . . 652, show the modified frequency f2 response; in contrast, receiver 654 continues to show no response at all. The fact that there is no detectable response at one of the receivers to the modification of the tone is indicative of a fault. Furthermore, 654 does not exhibit a detectable response to modification of any of the tones, as each are modified in turn. From this it may be deduced that the failure is related to the receiver 654 and is in the receiver circuit. Of course, the skilled person will appreciate that the same result will occur in the instance of a break on a read line which is closer to the receiver than the nearest intersection-which in this case is the intersection 634 with drive line 118. This nearest part of the read line may be considered to be part of the receiver circuit.

Figure 7A:
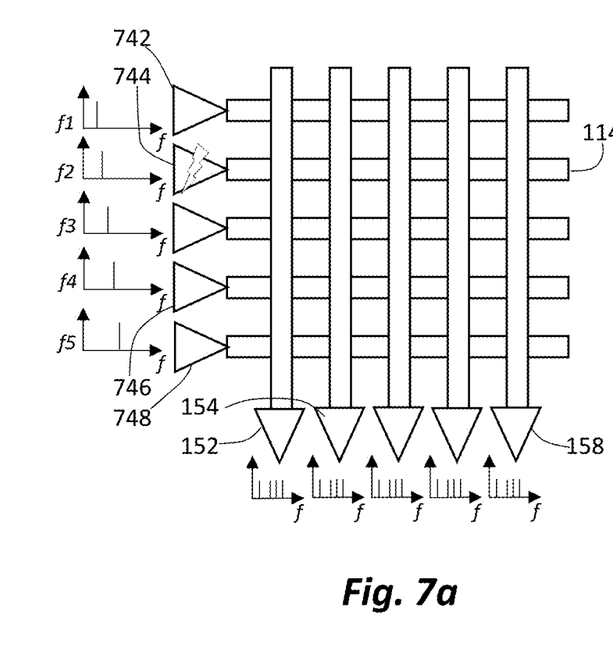
FIG. 7a and FIG. 7b illustrate a method according to one or more embodiments of the present disclosure, testing a touch-screen with yet another fault.
Figure 7B:
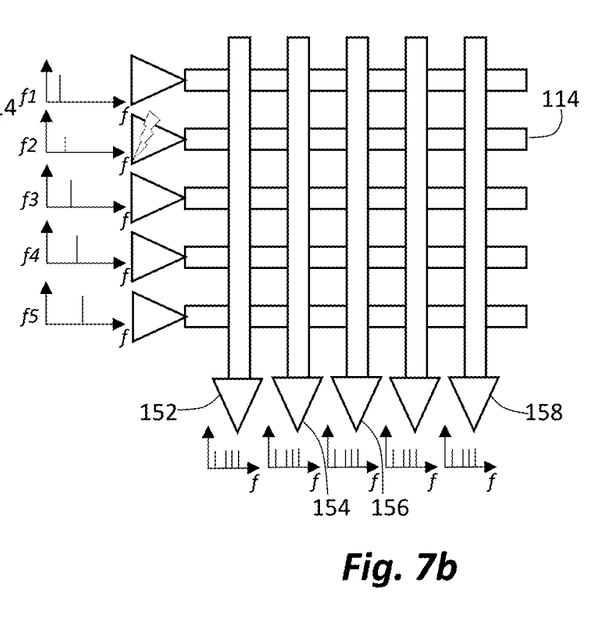

FIG. 7a and FIG. 7b illustrate a method according to one or more embodiments of the present disclosure, in which a self-test is applied to a touch screen which has a fault therein. In this example, the fault is a failure in one of the driver 742, 744, 746 . . . 748 shown in FIG. 7a, or in the respective drive circuit associated therewith. In this example, the failure is in the driver 744, or in the drive line 114 close to the driver. As a result, even during normal operation no signal at all, and in particular no tone having frequency f2, is present on line 114. There is thus no component having frequency f2 in the composite signals received by any the receivers 152, 154 . . . 158. FIG. shows one step of the self-test method, in particular FIG. 6b shows the step during which it is intended that the tone having frequency f2 provided by driver 144 to drive line 114 is modified. Of course, due to the failure of the drive circuit which includes the driver 144 itself and the nearby end of the drive line 114, there is still no signal at all on drive line 114. The composite signals received by all of the receivers 152, 154, 156 . . . 158, continue to entirely miss any component at frequency f2. Thus, none of the receivers exhibit a detectable response to the modification of this specific tone, from which it may be deduced that the fault lies in the driver circuit associated with driver 744.

As has been described hereinabove, the self-test methods according to embodiments of the present disclosure comprise modifying the amplitude of the respective tones applied to each of the drive lines. A particularly convenient modification of the amplitude is to reduce the amplitude for the duration of the testing of the corresponding drive line. Alternatively, the amplitude may be increased for the duration of the testing of the corresponding drive line. In yet other embodiments, the amplitude may be toggled between a high value and a low value, or even may be pulsed on and off, for the duration of the testing of the corresponding drive line.

The tones may be modified in sequence: that is to say, the tone f1 applied to drive line 112 may first be modified, in order to test drive line 112. Tone f1 may then be restored to its original amplitude, and tone f2 applied to drive line 114 modified. Once the drive line 114 has been tested, tone f2 is restored to its original amplitude, and tone f3, applied to drive line 116, is then modified. The modification to the tones may be carried out in a predefined sequence or cyclically such as f1, followed by f2, followed by f3, and so on. In other embodiments, the modifications to the tones may be carried out randomly. It will be appreciated that identification of a fault on a drive line or in a drive circuit occurs immediately that drive line drive circuit is tested. Conversely identification of a fault on a receive line or in a receiver circuit may require all of the drive lines to be tested.

According to other embodiments, the modifications of the tones may be carried out in pairs or in groups. The skilled person will appreciate that a sufficient number of different pairs or groups may be required to provide an "orthogonal" set of modifications in order to properly identify the nature of a fault.

Figure 8A:
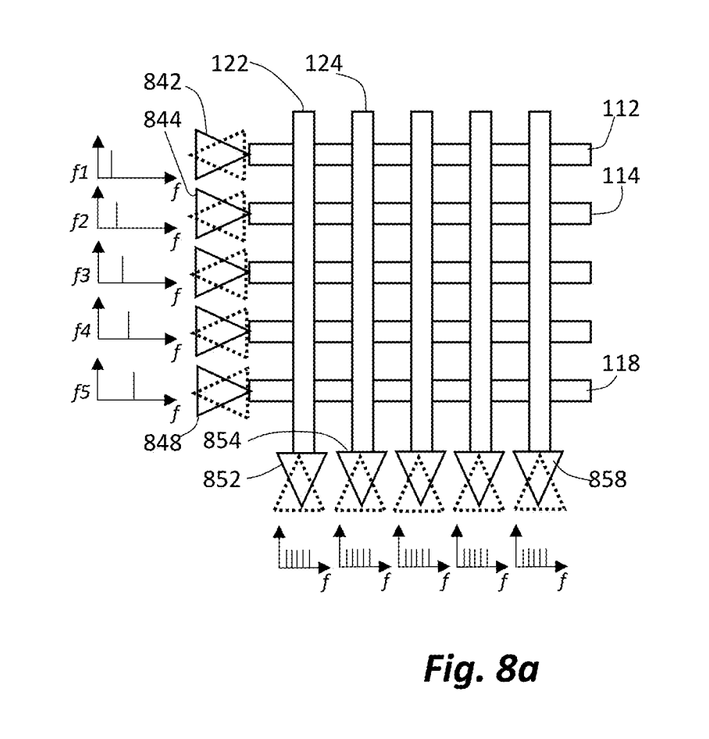
FIG. 8a and FIG. 8b illustrate a method according to one or more other embodiments of the present disclosure.
Figure 8B:
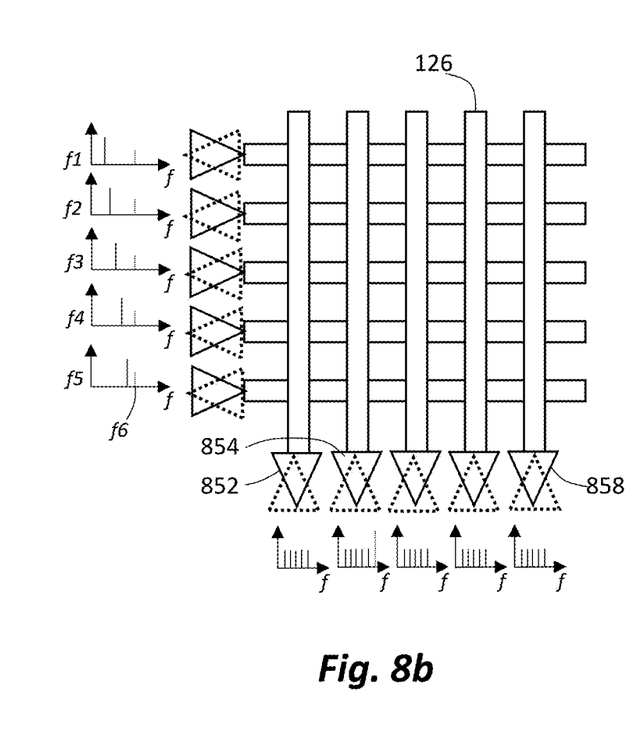

FIG. 8a and FIG. 8b illustrate a method according to one or more other embodiments of the present disclosure. In this embodiment, a driver is associated with each of the receivers 152, 154 . . . 158. Alternatively, the receivers 152, 154 . . . 158 are also enabled to operate as drivers. Similarly, a receiver is associate with each of the drivers 842, 844 . . . 848, or the drivers 142, 144 . . . 148 are also enabled to operate as receivers, as can be seen in FIG. 8a. In the following discussion, the term transceivers will be used both for the drivers 842, 844 . . . 848 which are operable as receivers, and the receivers 852, 854 . . . 858 which are operable as drivers although it will be understood that the first possibility of separate receivers and drivers is not meant to be excluded. According to these embodiments, a signal is injected from one of the transceivers 852, 854 . . . 858 'backwards', or as a 'reverse signal'. That is to say, the signal is injected onto one of the read lines, which for the sake of explanation will be chosen to be read line 126. In the case of fault-free operation, the read lines and the drive lines are all intact, so this injected signal is coupled to each of the drive lines by the crosspoint between the read line 126, and the respective drive lines. The transceivers for each of the drive lines then see this signal. As shown in FIG. 8b, the signal may be chosen to have a frequency f6 which is separate to each of the signals used in normal operation, so as not to interfere with normal operation. A reverse signal is injected into each of the read lines in turn. Provided that a response to the signal is seen on each of the drive lines in response to each of the injections, it may be concluded that the touch screen is fault-free. Conversely in case that a response to the signal is missing from one or more of the transceivers 852, 844 . . . 848 when a signal is injected into at least one of the read lines, it may be concluded that there is a fault in the touch screen.

Viewed from one aspect, then, embodiments of the present disclosure comprise modifying, in turn, the unique tones applied to each of the drive lines, and analysing the composite signals received by each of the receivers associated with a respective read line. The set of composite signals will exhibit one of several types of "signature". A fault free panel will show one type of signature-specifically the modification of each tone will be apparent in every composite signal. In the event that the panel has a fault or failure, that signature will not be accepted. Rather the set of composite signals will exhibit another signature. Composite signals may be analysed to determine the nature of the fault or failure.

From reading the present disclosure, other variations and modifications will be apparent to the skilled person. Such variations and modifications may involve equivalent and other features which are already known in the art of touchscreens, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

It is noted that one or more embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Features which are described in the context of separate embodiments may also be provided in combination in a single embodiment. Conversely, various features which are, for brevity, described in the context of a single embodiment, may also be provided separately or in any suitable subcombination.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims. Furthermore, the word "may" is used in a permissive sense (i.e., meaning having the potential to), rather than the mandatory sense (i.e., meaning must). Similarly, the words "include," "including," and "includes" mean including, but not limited to.

The invention claimed is:

1. A method of testing a capacitive touch screen, during the operation of which a drive signal is applied to a respective line of a first plurality of lines, each drive signal being unique, and each of a second plurality of lines is responsive to each of the drive signals, wherein a change in a response on a one of the second plurality of lines to a one of the drive signals on one of the first plurality of lines is indicative of a touch event at a cross-point of the one of the first plurality of lines with the one of the second plurality of lines, the method comprising:
   modifying an amplitude of a respective drive signal applied to each of the first plurality of lines; and
   in the event of identifying a response to each modified amplitude, on each of the second plurality of lines, determining that the touch screen does not have a fault, and otherwise determining that the touch screen has a fault.

2. The method according to claim 1, wherein the first plurality of lines is a first plurality of drive lines, and the second plurality of lines is a second plurality of read lines.

3. The method according to claim 1, further comprising, in the event of:
   identifying, for a drive signal applied to a one of the first plurality of lines, a response to the modified amplitude on a subset of the second plurality of lines, the subset consisting of less than the second plurality; and
   identifying a response to each of a remainder of the modified amplitudes, on each of the second plurality of lines:
   determining that the touch screen has a fault on the one of the first plurality of lines.

4. The method according to claim 1, further comprising, in the event of:
   identifying, for a subset of the drive signals applied to respective ones of the first plurality of lines, a response to the modified amplitude on each of the second plurality of lines except a one of the second plurality of lines,
   determining that the touch screen has a fault on the one of the second plurality of lines.

5. The method according to claim 1, further comprising, in the event of:
   identifying, for each of the drive signals applied to respective ones of the first plurality of lines, a response to the modified amplitude on each of the second plurality of lines except a one of the second plurality of lines,
   determining that the touch screen has a fault on a receive circuit of the one of the second plurality of lines.

6. The method according to claim 1, further comprising, in the event of:
   identifying, for each of the drive signals applied to respective ones of the first plurality of lines except a one of the drive signals, a response to the modified amplitude on each of the second plurality of lines,
   determining that the touch screen has a fault on a drive circuit for providing the one of the drive signals.

7. The method according to claim 1, wherein modifying an amplitude of the drive signal comprises a one of: reducing the amplitude of the drive signal; toggling the amplitude of the drive signal between a low value and a high value, and toggling the amplitude of the drive signal between a first value and zero.

8. The method according to claim 1, further comprising, after determining a response to the modified drive signal, on each of the second plurality of lines:
   identifying a change in response on a one of the second plurality of lines to a one of the drive signals, and
   determining a touch event at a cross-point of the drive line having the drive signal with the one of the lines.

9. The method according to claim 8, wherein the touch event comprises a physical contact between a user and the touch screen.

10. The method according to claim 1, further comprising, in event of identifying no response to the modified drive signal, on each of the second plurality of lines,
    determining that the touch screen has a drive circuit fault, wherein the drive circuit comprises the respective drive line and a driver connected to that drive line.

11. The method according to claim 1,
    wherein at least one of: the first plurality of lines and the second plurality of lines are arranged in a matrix of drive and read lines, and a respective cross-point between a drive line and a read line comprises a region of the touch screen in which the drive line and the read line are capacitively coupled.

12. The method according to claim 1,
    wherein the drive signals are orthogonal frequency signals.

13. The method according to claim 1, further comprising injecting a unique test signal on a one of the second plurality of lines,
    and in response to an event of identifying a response to the test signal, on each of the first plurality of lines,
    determining that the touch screen does not have a fault.

14. A capacitive touch screen assembly, comprising:
    a first plurality of lines, each having a driver therefor;
    a second plurality of lines each having a receiver therefor;
    a respective cross-point between each of the first plurality of lines;
    and a controller;
    wherein each of the drivers are each configured to apply a drive signal to a respective line of the first plurality of lines, each drive signal being unique;
    wherein a change in a response at a one of the receivers to a one of the drive signals on one of the first plurality of lines is indicative of a touch event at a corresponding cross-point;
    wherein the controller is configured to:
       control the drivers to modify an amplitude of a respective drive signal applied to each of the first plurality of lines; and
       in the event of identifying a response to each modified amplitude, on each of the second plurality of read lines,
       determine that the touch screen does not have a fault, and otherwise determine that the touch screen has a fault.

15. The capacitive touch screen assembly of claim 14 wherein the controller is further configured to, in the event of:
    identifying, for a drive signal applied to a one of the first plurality of lines, a response to the modified amplitude on a subset of the second plurality of lines, the subset consisting of less than the second plurality; and
    identifying a response to each of a remainder of the modified amplitudes, on each of the second plurality of read lines:
    determine that the touch screen has a fault on the one of the first plurality of lines.

16. The capacitive touch screen assembly of claim 14, wherein the controller is further configured to, in the event of:
  identifying, for a subset of the drive signals applied to respective ones of the first plurality of lines, a response to the modified amplitude on each of the second plurality of lines except a one of the second plurality of lines:
  determine that the touch screen has a fault on the one of the second plurality of lines.

17. The capacitive touch screen assembly of claim 14, wherein the controller is further configured to, in the event of:
  identifying, for each of the drive signals applied to respective ones of the first plurality of lines, a response to the modified amplitude on each of the second plurality of lines except a one of the second plurality of lines;
  determine that the touch screen has a fault on a receive circuit of the one of the second plurality of lines.

18. The capacitive touch screen assembly of claim 14, wherein the controller is further configured to, in the event of:
  identifying, for each of the drive signals applied to respective ones of the first plurality of lines except a one of the drive signals, a response to the modified amplitude on each of the second plurality of lines,
  determine that the touch screen has a fault on a drive circuit for providing the one of the drive signals.

19. The capacitive touch screen assembly of claim 14, wherein the controller is configured to control the drivers to modify an amplitude of the respective drive signal applied to each of the first plurality of lines, by a one of reducing the amplitude of the drive signal, toggling the amplitude of the drive signal between a low value and a high value, and toggling the amplitude of the drive signal between a first value and zero.

20. The capacitive touch screen assembly of claim 14, wherein at least one of:
  the first plurality of drive lines and the second plurality of read lines are arranged in a matrix, and a respective cross-point between a drive line and a read line comprises a region of the touch screen in which the drive line and the read line are capacitively coupled.

\* \* \* \* \*